UNITED STATES PATENT OFFICE.

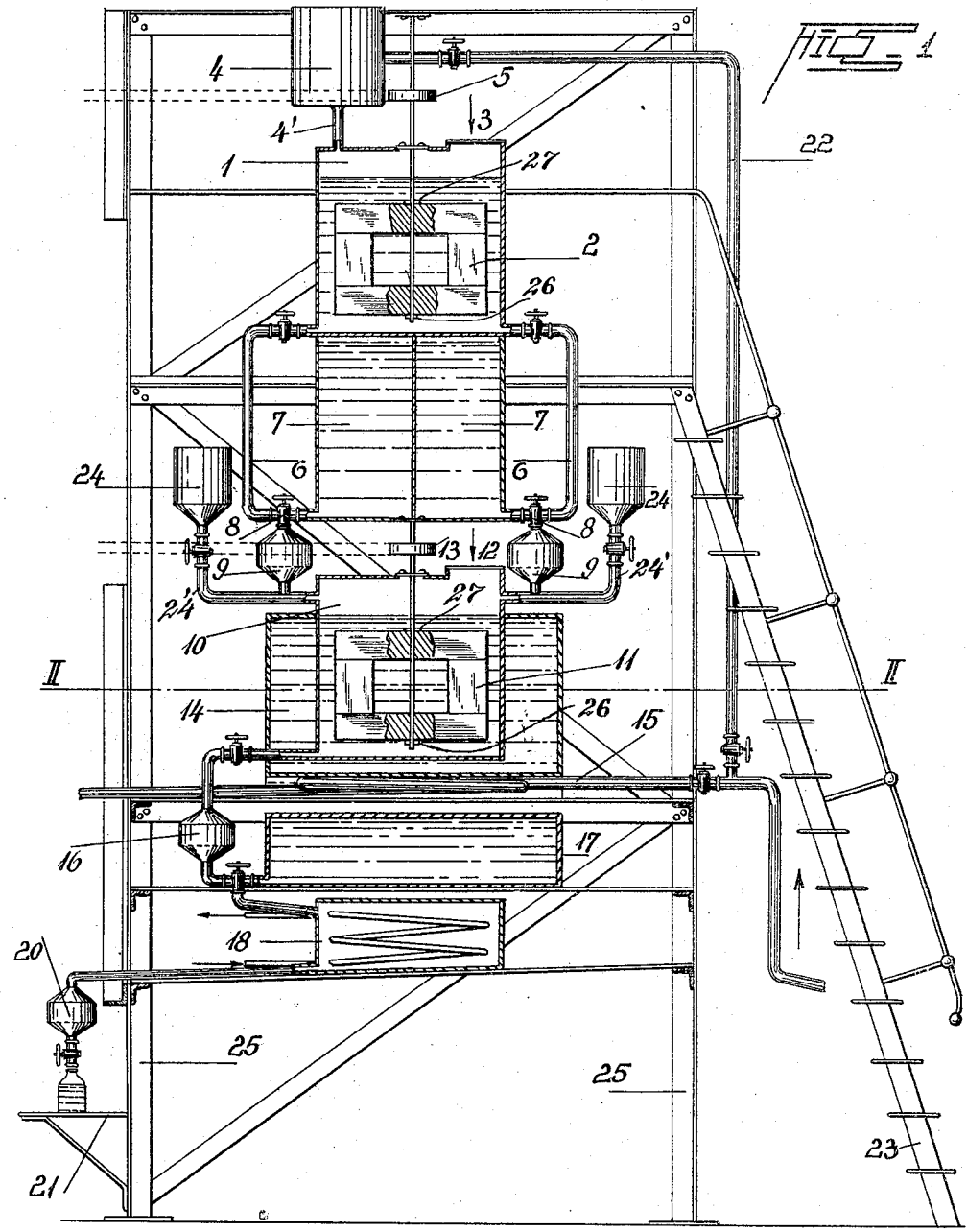

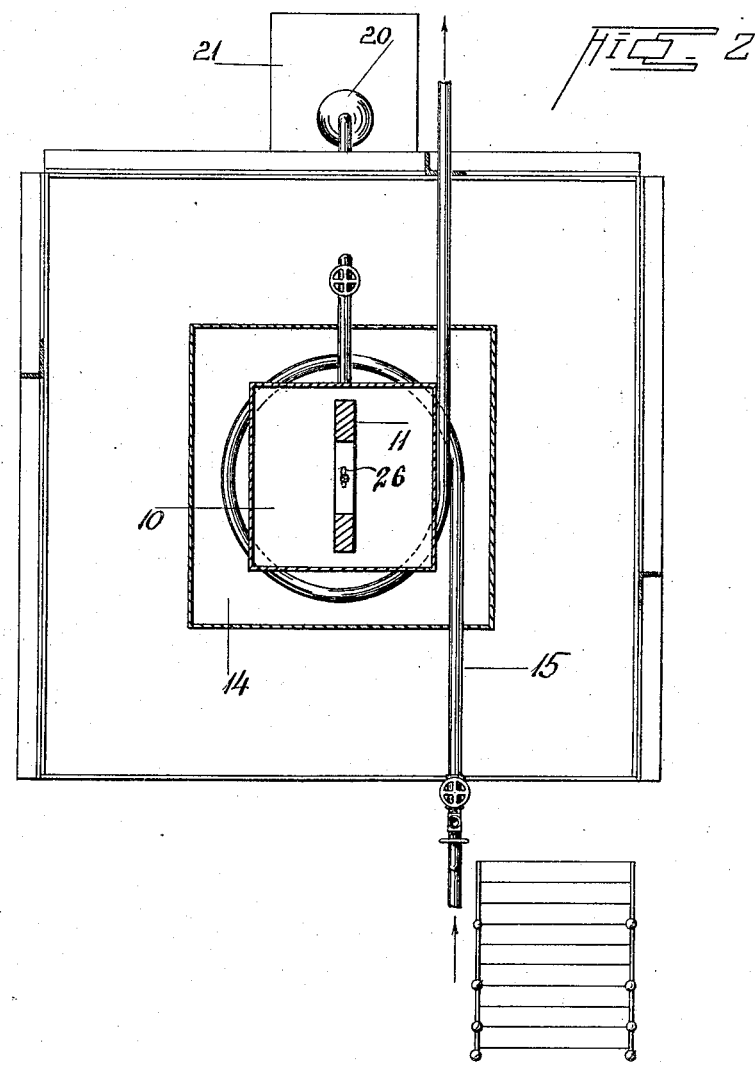

GUSTAV VON RIGLER, OF KLAUSENBURG, AUSTRIA-HUNGARY.

APPARATUS FOR MANUFACTURING MILK.

1,200,782. Specification of Letters Patent. Patented Oct. 10, 1916.

Original application filed May 22, 1913, Serial No. 769,178. Divided and this application filed March 6, 1914. Serial No. 822,843.

*To all whom it may concern:*

Be it known that I, GUSTAV VON RIGLER, a subject of the King of Hungary, residing in Klausenburg, Austria-Hungary, professor in the University of Kolozsvar, Hungary, have invented certain new and useful Improvements in Apparatus for Manufacturing Milk, of which the following is a specification.

The invention relates to apparatus for the production of artificial milk, similar not only to the composition and appearance of the natural milk, but also in behavior when subjected to the ordinary methods of treating milk, such as cooking, cooling, coagulating, etc.

The attaining of the latter quality is the object of the present invention. For it is not difficult, from constituents such as are contained in natural milk, to produce a fluid whose composition is similar to that of the natural milk, possessing the external qualities of the same. I have, however, so selected materials to be employed in the production and to so treat them that the artificial milk thus formed will undergo cooking, cooling and other operations which are carried on with milk in the household and in the food industry like the natural milk and without their milky qualities suffering a change. The present invention answers these demands, gluten being employed as the albuminous matter for the production of the artificial milk, which material can be dissolved or suspended in the solvent in such a way that the same remains in uniform distribution both under heat and under cold at rest or in motion, and also holds the other materials combined in solution, for instance, the fat in perfect emulsion and in consequence thereof can easily be sterilized, preserved and transported.

The use of gluten as albuminous basic material for the artificial milk offers the still further advantage that the same is available in large quantities and at relatively low prices and in consequence of its vegetable origin excludes those dangers which in the use of animal albuminous material, in consequence of the disease causing bacteria and spores contained in certain cases in them, can occur, an advantage which in a food, like milk, which forms the specific food of nursing children, sick people, convalescent and weak people, needs no extensive discussion. It must be consequently considered an extremely fortunate circumstance that it has been possible to discover right in a vegetable albuminous material, in gluten, that albuminous material which perfectly answers all the requirements for the production of artificial milk.

For the purpose of transferring the gluten into the partly dissolved, partly suspended form, similar to the albuminous materials of the natural milk the gluten in accordance with the process of the present invention is used in the fresh raw condition. In such treatment of the gluten there are employed very diluted solvents or suspending means and very energetic mechanical agitation.

As solvent or suspending means there is used a very dilute aqueous alkali solution, preferably a potassium hydrate solution, to which a little alcohol is added. The dissolving or suspending of the fresh gluten in this solution is carried out at ordinary temperature and the mechanical treatment is continued until a liquid of slightly yellowish color, thick, opaque and strongly foaming appears. From which on standing only the starch kernels contained in the gluten separate, and these are run off by filtration, standing or removed in any other way. The appearance of the liquid thereby suffers no change, and the filtered liquid shows no perceptible change if it is allowed to stand for a considerable time, is heated or cooled or treated mechanically, for example, shaken or stirred. The reaction of the liquid should be very weakly alkaline. Therefore the amount of alkali employed for the solvent or suspending liquid must be proportioned in accordance with the amount of gluten to be added. As an example, if 150 grams of raw gluten is to be employed per liter of the finished product then there is employed a potassium lye of 0.10 to 0.15 per cent. strength, which contains 0.5% alcohol.

The product above described forms the basic material upon which this apparatus is peculiarly designed to operate in the manufacture of the artificial milk. Into this basic material there are now brought the necessary mineral constituents, taking into consideration the composition of the water to be employed and the circumstance that the basic material already contains the necessary amount of potassium—if potassium lye was employed in the production of the same. As a general rule then, the use of pure faultless drinking water being assumed, to which of course the greatest care is to be given, it becomes a question of the addition of the lime, soda, chlorin and phosphorus. These materials are preferably added in the form of cooking salt, lime water, and phosphoric acid to the basic material, and in the form of previously prepared dilute solutions. In adding these materials care is to be taken that the basic material does not lose its alkaline reaction.

To the basic fluid there is added the requisite sweetening material—sugar of any kind or, if prepared for those suffering from sugar in the blood, in the place of the sugar, saccharin. These materials are preferably put in the solid condition into the liquid and dissolved in this itself.

The alkalinity of the basic fluid containing the mineral materials and sweetening material should preferably for ten c. c. of liquid correspond to 0.5 c. c. of 10% normal acid (indicator phenolphtalein).

The fat is emulsified in the basic liquid, which is preferably performed under very energetic mechanical treatment at a somewhat high temperature—about 70–100° C. As fat substances there are employed preferably vegetable fats or vegetable oils, from the same hygienic standpoint as was mentioned above with reference to the vegetable albumin, the gluten. Of course, however, in case of necessity animal fats or oils can also be employed. With regard to the fact that at times cocoanut fat can be most easily and cheaply obtained there will be set forth at length hereinafter the treatment of the cocoanut fat as the representative of the fats employed.

An amount of cocoanut fat amounting to about 3.5% by weight of the basic fluid is melted in hot water and then mixed with the basic fluid heated to at least 70° C. The mixing is carried on slowly at the beginning, then gradually more rapidly and energetically and at the same time the temperature of the basic fluid is gradually increased, preferably by means of the water or steam bath, for example, in such manner that the same rises about 10° C. every quarter of an hour up to 100° C., at which temperature the stirring is continued still for about half an hour longer. If care is taken for a corresponding energetic mixing then in this manner within four to five quarter hours the finished, hot and consequently sterile milk is let off and in case care is taken for suitable settling, filtering, cooling and bottle-filling devices, can be filled in bottles in a sterile condition.

The finished artificial or vegetable milk possesses in many respects the characteristics of natural milk. It curdles in the open air in open vessels. The curd is of a looser structure and consists of finer flocks than that of cow's milk. The taste of the same is an agreeable sweetish sour. After three days the curd rises to the surface in consequence of the bubbles ($Co_2$) developed in the same. When the curdled artificial milk is cooked the coagulate thickens and forms a mass similar to the curd yet somewhat looser. This possesses a very agreeable taste similar to that of the curd of sheep's milk. This curd can be employed for all purposes of cooking in the same manner as animal curd. By inoculating with kephir of joghurt fungus there is obtained from the artificial milk a food similar to the product obtained from cow's milk of loose curd and agreable taste.

In the accompanying drawings is illustrated one praticable embodiment of a form of my improved apparatus, in which drawing—

Figure 1 is a vertical section of the apparatus, and Fig. 2 a cross-section taken on a plane at about the line II—II of Fig. 1.

The apparatus comprises such a grouping of the mixing, clarifying, emulsifying and cooling devices that the same are arranged in the succession of their application as regards each other in such a manner that the liquid flows immediately out of one device into the next succeeding it. This, with a proper arrangement and adjustment of valves enables the purifying and sterilizing of the entire apparatus with hot washing or sterilizing liquid or water.

In the drawing the mixing vessel serving for the production of the basic fluid is designated by the reference character 1, the stirring device 2, the feeding inlet 3, the expansion vessel 4, for receiving the foam. The stirring device rotates preferably at 150–200 revolutions per minute, and the mixing receptacle has preferably a quadratic cross-section. It has been demonstrated that the illustrated construction of mixer effects the solution or suspending of the gluten in a relatively short time with perfectly satisfactory results, the rotary stirrer in the quadratic mixing chamber producing eddy currents which are desirable in making an emulsion. The foam receiver 4 communicates with the upper part of the mixing chamber through a narrow passage, a conduit 4' of small cross-sectional area being illustrated.

It has further been proved as advantageous to so arrange the stirring device that the same does not touch the bottom of the receptacle. The frame constituting the stirring device is shown located below the normal surface level of the liquid in the mixing chamber, and is suspended therein in such manner that an entirely free space is present between the bottom of the said frame and the bottom of the said chamber. This free and open space materially contributes to the accomplishment of the desired results.

5 is the belt pulley of the stirring device.

The finished basic fluid flows through the pipes 6—6 provided with valves alternately into the one or the other of the settling receptacles 7 7, so that for further working settled basic fluid can always be available out of which the starch content of the gluten is already separated. By proper adjustment of the three-way valve 8 8, the settled basic fluid is now let off through one of the filters 9 9, into the fat emulsifying receptacle 10 provided with a stirring device 11 driven by the pulley 13, into which fat emulsifying receptacle the fatty material is introduced by the feeding inlet 12. The construction of the stirring device illustrated is identical with that of the one previously mentioned; the emulsifying vessel also possesses advantageously a quadratic horizontal cross-section, and is also furnished with receptacles 24—24 for the reception of the foam. Conduits 24' 24', preferably of small cross-section, are illustrated for establishing communication between the upper part of the emulsifying vessel 10 and the expansion vessels or foam receivers 24—24. A foam receiver is preferably provided for each side of the vessel 10. Valves are shown in the conduits 24'—24' which are useful when cleansing or sterilizing the apparatus. The stirring device should be able preferably to rotate at the rate of 400 rotations per minute. The emulsifying vessel stands in the water bath 14, which by means of the heating worm 15 can be heated with hot water to about 100° C. Finished milk flows through the filter 16 into the pre-cooling receptacle 17, where it will remain for about an hour subjected to the slow, cooling action of the same, then it is subjected to the rapid action of the cooler 18, and finally passed to the filter 20. It will be perfectly cooled and filtered and can be filled at 21 in bottles.

By means of the branch pipe 22 the entire apparatus can be placed under hot water or any other sterilizing and purifying fluid, which flowing over the ordinary course of the milk rinses and sterilizes the same. There are provided for the purpose of mechanical purification of the receptacles suitably disposed holes. The whole apparatus is arranged on the frame 25 and the ladder 23 makes the higher lying portions easily accessible.

As is seen the fluid traverses the apparatus up to the point of the complete finishing of the milk in a closed stream without the same coming into contact with the outer air or the human hand, so that the possibility of infection is avoided.

The stirrers 2 are illustrated formed of a number of pieces of wood dovetailed together, and held to their shafts by some suitable means, such as pins 26 and 27.

It will be understood that the foregoing is illustrative of my invention, and that changes may be made within the scope of the claims without departing from the spirit of the invention.

This application is a division of my application Serial No. 769,178, filed May 22, 1913, for artificial milk and the process of and apparatus for the production of the same.

I claim as my invention:—

1. A milk manufacturing plant comprising mixing chambers, settling and cooling chambers, filters, etc., so constructed, connected together and relatively disposed that the material under treatment passes by gravity from one part of the apparatus to the next in order in a closed stream shielded from the outer air, thereby facilitating the carrying out of the process and also affording means wherein the entire apparatus may be placed under the influence of sterilizing and purifying fluid flowing through the apparatus over the ordinary course of the milk.

2. In a device for the production of artificial milk the combination with a mixing chamber, a plurality of settling chambers, pipes extending from the mixing chamber to the settling chambers, a second mixing chamber and a conduit extending from each of the settling chambers to said mixing chamber.

3. In a device for the production of artificial milk the combination with a mixing chamber, of a foam receiver disposed above said mixing chamber and a conduit of small cross-sectional area extending from the upper part of the mixing chamber to said receiver.

4. In a device for the production of artificial milk the combination with a mixing chamber, of a stirrer therein, a foam receiver disposed above said mixing chamber, and a conduit of small cross-sectional area extending from the upper part of the mixing chamber to said receiver.

In witness whereof, I have hereunto signed my name in the presence of two subscribing witnesses.

GUSTAV von RIGLER.

Witnesses:
  Dr. FRIEDRICHSTEIN,
  ARTHUR VOLTANK.

Copies of this patent may be obtained for five cents each, by addressing the "Commissioner of Patents, Washington, D. C."